(12) United States Patent
Isozaki

(10) Patent No.: US 8,331,580 B2
(45) Date of Patent: Dec. 11, 2012

(54) ENGINE SPEED CALCULATION DEVICE AND ENGINE SOUND GENERATION DEVICE

(75) Inventor: Yoshimasa Isozaki, Shizuoka-ken (JP)

(73) Assignee: Yamaha Corporation (JP)

( * ) Notice: Subject to any disclaimer, the term of this patent is extended or adjusted under 35 U.S.C. 154(b) by 532 days.

(21) Appl. No.: 12/646,262

(22) Filed: Dec. 23, 2009

(65) Prior Publication Data

US 2010/0166210 A1 Jul. 1, 2010

(30) Foreign Application Priority Data

Dec. 26, 2008 (JP) .................. 2008-334233

(51) Int. Cl.
*H04B 1/00* (2006.01)
*B60Q 1/00* (2006.01)

(52) U.S. Cl. .................. 381/86; 381/61; 340/441

(58) Field of Classification Search .................. 381/61, 381/86; 340/441; 700/94; 446/7; 702/142, 702/145, 148; 701/22
See application file for complete search history.

(56) References Cited

U.S. PATENT DOCUMENTS

| | | | |
|---|---|---|---|
| 5,371,802 A | 12/1994 | McDonald et al. | |
| 5,635,903 A | 6/1997 | Koike et al. | |
| 6,959,094 B1 * | 10/2005 | Cascone et al. | 381/86 |
| 7,606,374 B2 * | 10/2009 | Maeda | 381/61 |
| 7,979,147 B1 * | 7/2011 | Dunn | 700/94 |
| 8,059,829 B2 * | 11/2011 | Kobayashi et al. | 381/86 |
| 2005/0113168 A1 | 5/2005 | Madea | |
| 2005/0213776 A1 * | 9/2005 | Honji et al. | 381/86 |
| 2010/0042281 A1 * | 2/2010 | Filla | 701/22 |
| 2010/0208915 A1 * | 8/2010 | Lipp | 381/86 |

FOREIGN PATENT DOCUMENTS

| | | |
|---|---|---|
| JP | 11-266501 A | 9/1999 |
| JP | 11-288291 A | 10/1999 |
| JP | 2000-10576 | 1/2000 |
| JP | 2000-316201 A | 11/2000 |
| JP | 2004-322990 A | 11/2004 |

OTHER PUBLICATIONS

Extended European Search Report issued in corresponding European Patent Application No. 09015954.2 dated Jun. 17, 2010.

* cited by examiner

*Primary Examiner* — Vivian Chin
*Assistant Examiner* — Andrew Graham
(74) *Attorney, Agent, or Firm* — Rossi, Kimms & McDowell LLP

(57) ABSTRACT

An engine sound generation device adapted to an electric vehicle includes an engine speed calculation unit which calculates the virtual engine speed based on the motor revolution speed, vehicle speed, and acceleration opening. The engine speed calculation unit calculates the virtual engine speed with reference to the vehicle-dependent engine speed memory on the condition that the virtual engine speed is deemed proportional to the vehicle speed. In addition, the engine speed calculation unit calculates the virtual engine speed with reference to the vehicle-nondependent engine speed memory on the condition that the virtual engine speed is not deemed proportional to the vehicle speed, thus generating the common engine sound matching the behavior of an engine in a prescribed event such as the startup of the electric vehicle and the semi-engagement of a clutch.

5 Claims, 7 Drawing Sheets

ENGINE SPEED CALCULATION DEVICE AND ENGINE SOUND GENERATION DEVICE

BACKGROUND OF THE INVENTION

1. Field of the Invention

The present invention relates to engine speed calculation devices and engine sound generation devices for generating engine sound simulated in traveling conditions of four-wheeled vehicles and motorcycles.

The present application claims priority on Japanese Patent Application No. 2008-334233, the content of which is incorporated herein by reference.

2. Description of the Related Art

Recently, electric vehicles driven by electric motors and hybrid vehicles driven by engines and electric motors have widely spread among people highly concerned with environmental conservation. Compared to conventional four-wheeled vehicles, electric vehicles and hybrid vehicles are advantageous in that they generate very small noise while traveling. This adversely causes a traffic problem in that pedestrians may hardly notice electric vehicles approaching them. Since engine-driven vehicles differ from electric vehicles in sounds generated during driving at the same velocity, drivers who are accustomed to engine-driven vehicles but are not accustomed to electric vehicles may have a sense of incongruity in driving electric vehicles. To solve such a drawback, various devices are developed to calculate virtual engine speeds based on parameters such as accelerator openings (e.g. throttle valve openings, fuel injector valve openings, depressions of accelerator pedals) and traveling speeds of vehicles and to thereby generate pseudo engine sounds as alarm sounds based on virtual engine speeds. Patent Document 1 discloses a simulated engine sound generating device.

Patent Document 1: Japanese Unexamined Patent Application Publication No. 2000-10576

Patent Document 1 simply discloses a device which calculates virtual engine speed based on the traveling speed of a vehicle; hence, when the actual traveling speed does not vary in proportion to the virtual engine speed at startup of a vehicle or in a semi-engagement of a clutch, the generated engine sound (or alarm sound) may be heard as an artificially affected sound.

SUMMARY OF THE INVENTION

It is an object of the present invention to provide an engine speed calculation device and an engine sound generation device, which are capable of generating an artificial engine sound close to the actual engine sound produced by an engine-driven vehicle even when the calculated engine speed does not vary in proportion to the traveling speed of a vehicle such as an electric vehicle and a hybrid vehicle.

The present invention is directed to an engine sound generation device including an accelerator opening sensor detecting an accelerator opening of a vehicle, a vehicle speed sensor detecting a vehicle speed of the vehicle, a vehicle-nondependent engine speed memory storing a virtual engine speed which depends upon the accelerator opening but does not depend upon the vehicle speed in advance, and an engine speed calculation unit acquiring the virtual engine speed from the vehicle-nondependent engine speed memory in correspondence with the accelerator opening on the condition that the virtual engine speed is not deemed proportional to the vehicle speed. It the engine sound generation device further includes an engine sound generation unit which artificially generates an engine sound based on the virtual engine speed.

In the above, the engine speed calculation unit calculates the virtual engine speed without using the vehicle speed and with reference to the vehicle-nondependent engine speed memory on the condition that the virtual engine speed is not proportional to the vehicle speed. This prevents the virtual engine speed calculation unit from miscalculating the virtual engine speed based on the vehicle speed which is not proportional to the virtual engine speed, thus prevent the artificially affected engine sound from being produced based on the miscalculated virtual engine speed. In other words, the engine sound generation device of the present invention is capable of generating the common engine speed matching the behavior of an engine in an electric vehicle driven by an electric motor.

In addition, the vehicle-nondependent engine speed memory stores a table of time-related variations of the virtual engine speed in connection to the accelerator opening, thus allowing the engine speed calculation unit to read the virtual engine speed from the table in correspondence with the accelerator opening and an elapsed time.

Alternatively, the vehicle-nondependent engine speed memory stores a table of an engine speed increase rate in connection to the accelerator opening, thus allowing the engine speed calculation unit to read the engine speed increase rate from the table in correspondence with the accelerator opening and to thereby calculate the virtual engine speed by use of an elapsed time. The virtual engine speed is varied continuously with respect to time while following up with variations of the accelerator opening. In other words, it is possible to prevent the virtual engine speed from being varied discontinuously, thus precisely calculating the virtual engine speed nondependent upon the vehicle speed.

BRIEF DESCRIPTION OF THE DRAWINGS

These and other objects, aspects, and embodiments of the present invention will be described in more detail with reference to the following drawings.

FIG. 3A shows a table storing the speed in connection to the vehicle speed and the acceleration opening in an acceleration mode of a vehicle.

FIG. 3B shows a table storing the speed in connection to the vehicle speed and the acceleration opening in a deceleration mode of the vehicle.

DESCRIPTION OF THE PREFERRED EMBODIMENTS

The present invention will be described in further detail by way of examples with reference to the accompanying drawings.

1. First Embodiment

Figure 1:
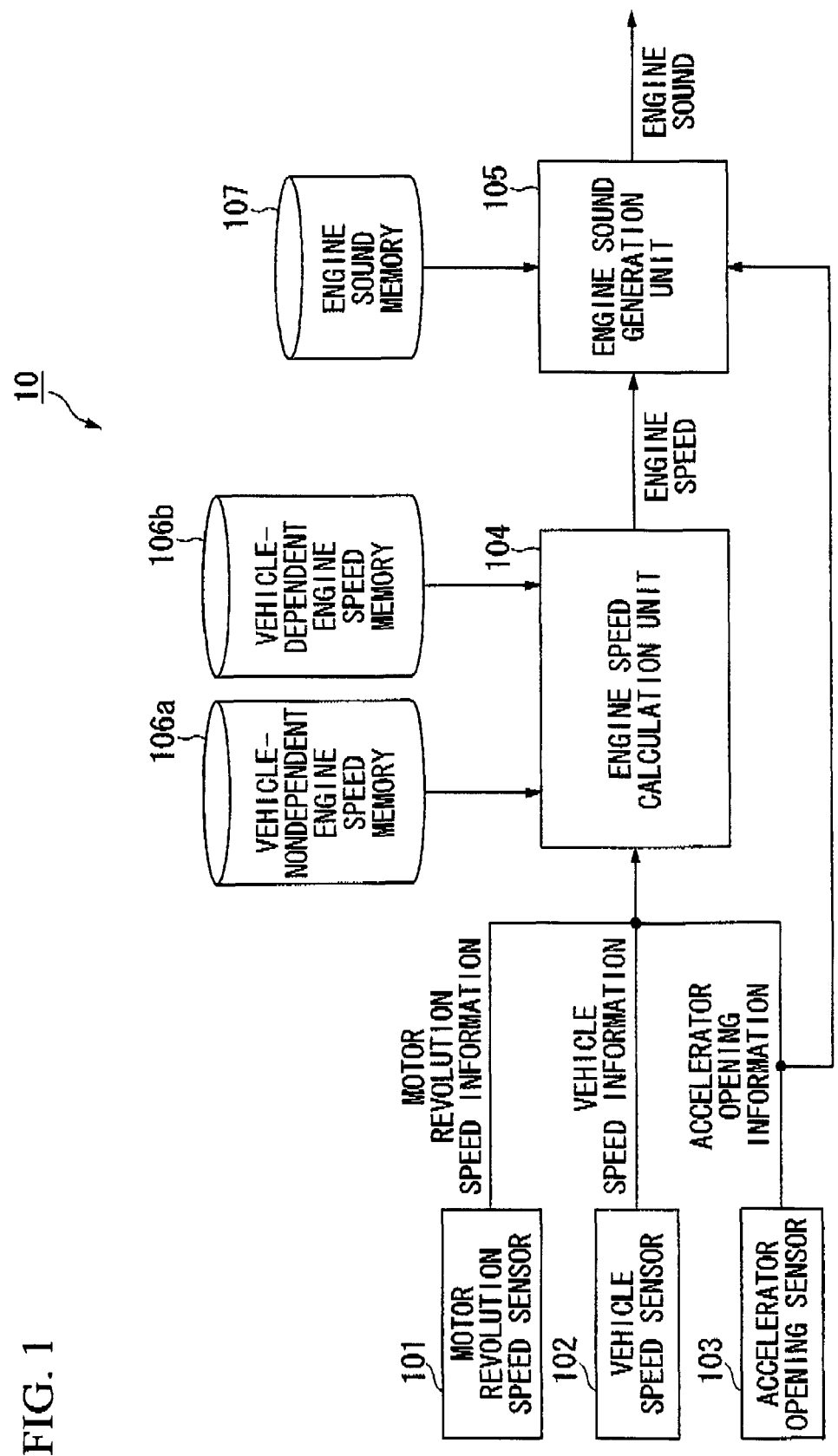
FIG. 1 is a block diagram showing the constitution of an engine sound generation device according to a first embodiment of the present invention.

FIG. 1 is a block diagram showing the constitution of an engine sound generation device 10 according to a first embodiment of the present invention.

The engine sound generation device 10 is constituted of a motor revolution speed sensor 101, a vehicle speed sensor 102, an accelerator opening sensor 103, an engine speed calculation unit 104, an engine sound generation unit 105, a vehicle-nondependent engine speed memory 106a, a vehicle-dependent engine speed memory 106b, and an engine sound memory 107. The following description is related to an electric vehicle equipped with an electric motor only, in which the terms such as engine and transmission are used as imaginary factors.

The motor revolution speed sensor 101 detects the revolution speed of an electric motor (serving as a driving source of a four-wheeled vehicle) so as to produce motor revolution speed information. The vehicle speed sensor 102 detects the revolution speed of wheels of the vehicle so as to produce vehicle speed information. The accelerator opening sensor 103 detects the depression of an accelerator pedal (not shown) so as to produce accelerator opening information. The first embodiment detects the accelerator opening in sixteen ranges denoted by "0" to "15", in which a larger range represents a deeper depression of an accelerator pedal.

All the motor revolution speed information, the vehicle speed information, and the accelerator opening information are supplied to the engine speed calculation unit 104 from the motor revolution speed sensor 101, the vehicle speed sensor 102, and the acceleration opening sensor 103. The acceleration opening information of the acceleration opening sensor 103 is supplied to the engine sound generation unit 105 as well.

The engine speed calculation unit 104 refers to the vehicle-nondependent engine speed memory 106a or the vehicle-dependent engine speed memory 106b based on the motor revolution speed information, the vehicle speed information, and the acceleration opening information, thus acquiring a virtual engine speed. The virtual engine speed is supplied to the engine sound generation unit 105. That is, the engine speed calculation unit 104 estimates whether or not the virtual engine speed is deemed proportional to the vehicle speed based on the motor revolution speed information, the vehicle speed information, and the accelerator opening information. When the engine speed calculation unit 104 estimates that the virtual engine speed is not deemed proportional to the vehicle speed, for example, at startup of a vehicle or in the semi-engagement of a clutch (which presumably occurs in an engine-driven vehicle), it retrieves a desired value of the virtual engine speed from the vehicle-nondependent engine speed memory 106a which stores various values of the virtual engine speed dependent upon the accelerator opening but not dependent upon the vehicle speed. In a nondependent state, the same value of the virtual engine speed is assigned to various values of the vehicle speed. When the engine speed calculation unit 104 estimates that the virtual engine speed is deemed proportional to the vehicle speed, it retrieves another value of the virtual engine speed, which is dependent upon both the accelerator opening and the vehicle speed, from the vehicle-dependent engine speed memory 106b.

Based on the virtual engine speed and the accelerator opening information, the engine sound generation unit 105 refers to the engine sound memory 107 so as to generate a voltage signal representing a sound-pressure waveform of an engine sound. The voltage signal is supplied to an external speaker (not shown).

Figure 2:
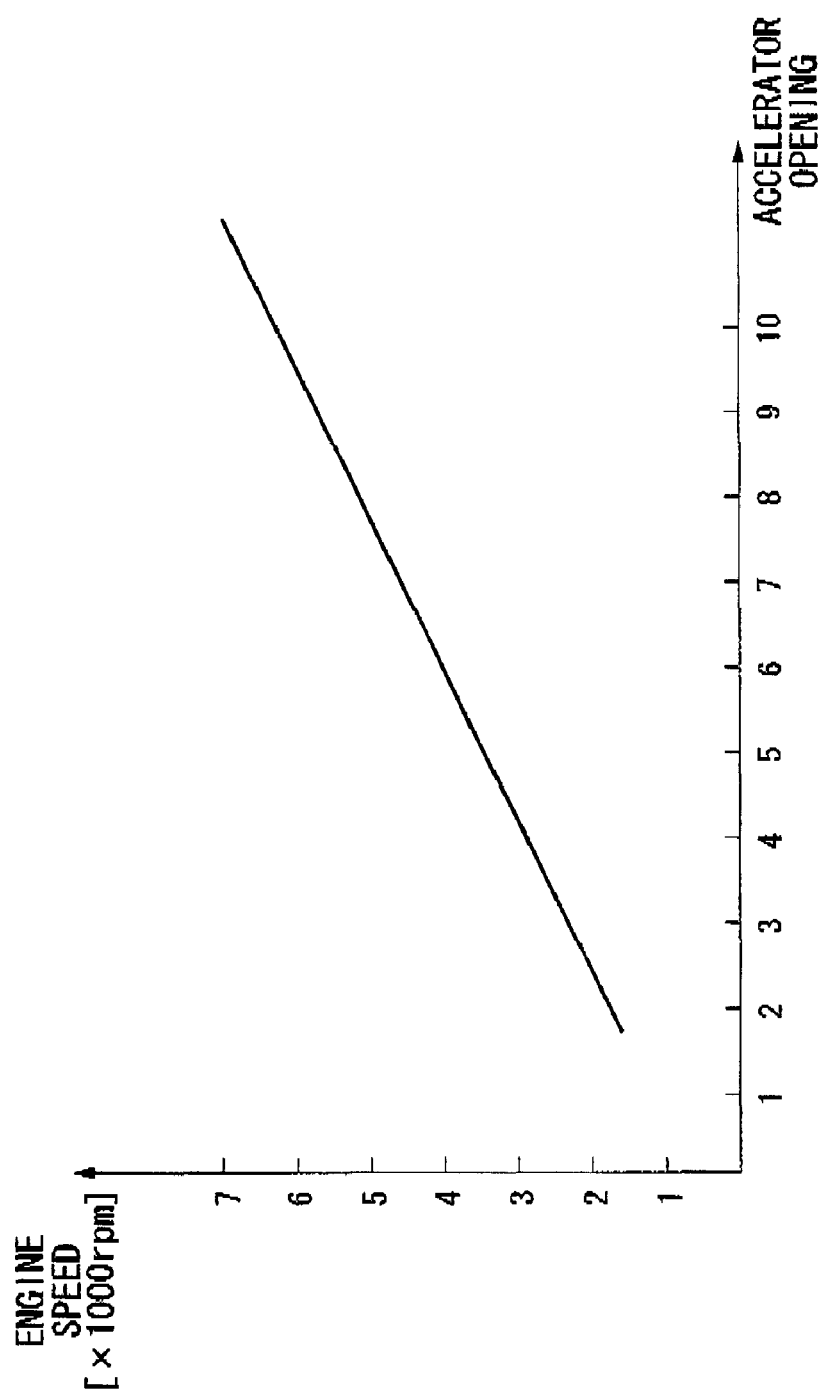
FIG. 2 is a graph exemplifying the relationship between the accelerator opening and the virtual engine speed.

FIG. 2 is a graph exemplifying data stored in the vehicle-nondependent engine speed memory 106a in connection with a table of the relationship between the accelerator opening and the virtual engine speed, wherein the horizontal axis represents the accelerator opening, and the vertical axis represents the virtual engine speed in units of 1,000 rpm. FIG. 2 shows that a low engine speed is assigned to a low accelerator opening, and a high engine speed is assigned to a high accelerator opening. When the engine speed calculation unit 104 determines that the virtual engine speed does not vary in proportion to the vehicle speed, it reads the virtual engine speed from the above table (see the illustration of FIG. 2) in correspondence with the accelerator opening information, thus supplying the read virtual engine speed to the engine sound generation unit 105.

Next, the contents of the vehicle-dependent engine speed memory 106b will be described in conjunction with FIGS. 3A and 3B and Table 1.

Figures 3A, 3B:
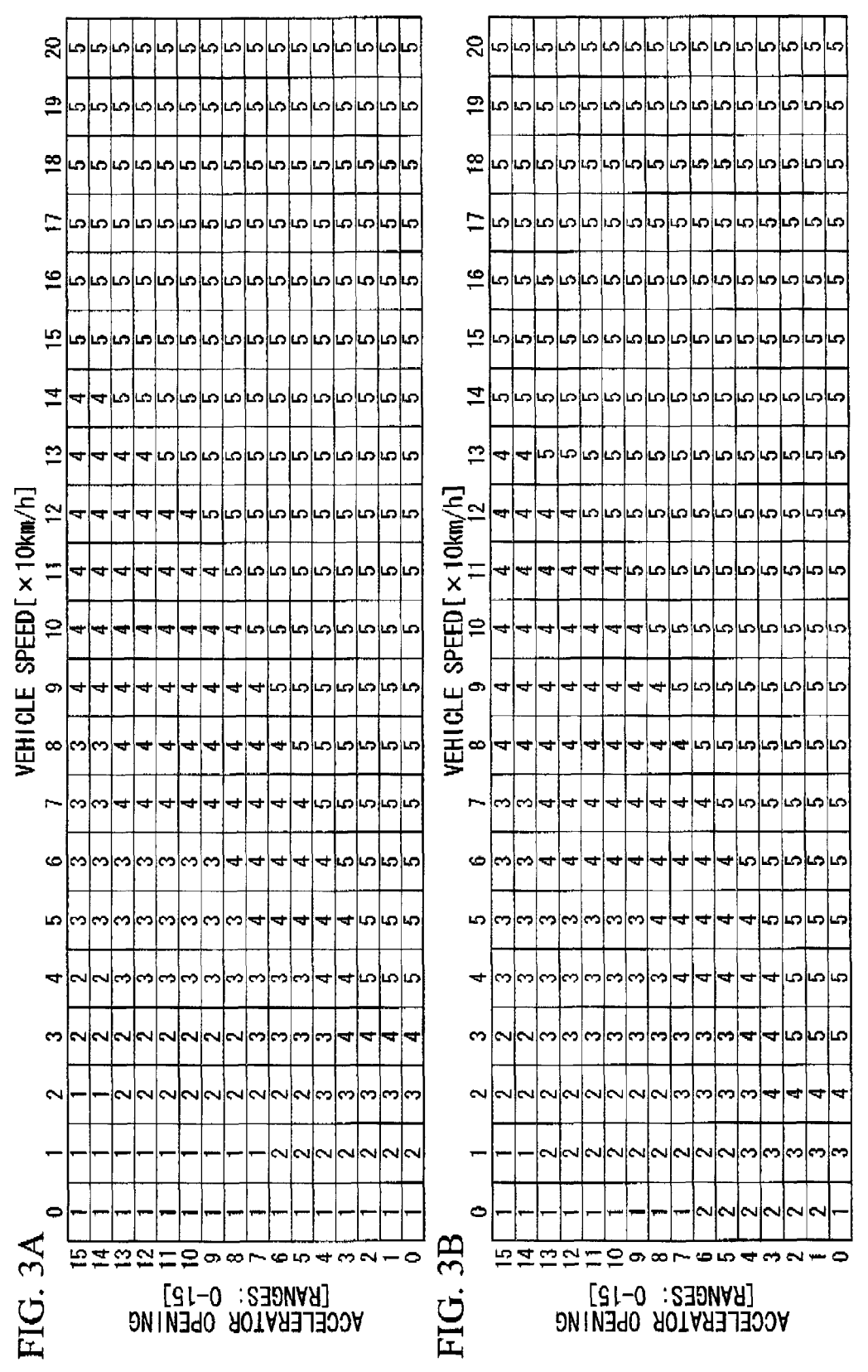

FIGS. 3A and 3B show the contents of tables storing speeds (i.e. gear-selector positions ranging from "1" to "5" in a five-gear transmission) in connection to the vehicle speed (ranging from "0" to "20"×10 km/h) and the accelerator opening (ranging from "0" to "15). The table of FIG. 3A is used in an acceleration mode of the vehicle, while the table of FIG. 3B is used in a deceleration mode of the vehicle. The reason why the different tables are used for the acceleration mode and the deceleration mode is to prevent the gear-selector position from being frequently shifted when the vehicle speed is repeatedly increased and decreased in a small range of speed. When the engine speed calculation unit 104 estimates that the virtual engine speed is deemed proportional to the vehicle speed, it adopts either the acceleration-mode table of FIG. 3A or the deceleration-mode table of FIG. 3B, thus reading out the number of speeds in connection to the acceleration opening information and the vehicle speed information. In the horizontal axes of FIGS. 3A and 3B, the vehicle speed "0" ranges from 0 km/h to 10 km/h, and vehicle speed "1" ranges from 10 km/h to 20 km/h.

TABLE 1

| Speed (Gear-Selector Position) | Gear Ratio |
| --- | --- |
| 1 | 3.5 |
| 2 | 2.6 |
| 3 | 1.4 |
| 4 | 1 |
| 5 | 0.75 |

Table 1 defines the relationship between the speed (i.e. the gear-selector position) and the gear ratio, wherein the gear ratio is the ratio of the virtual engine speed (or the transmission input) to the engine speed (or the transmission output). Using the speed read from the table of FIG. 3A or FIG. 3B, the engine speed calculation unit 104 reads the corresponding gear ratio from Table 1.

Figure 4:
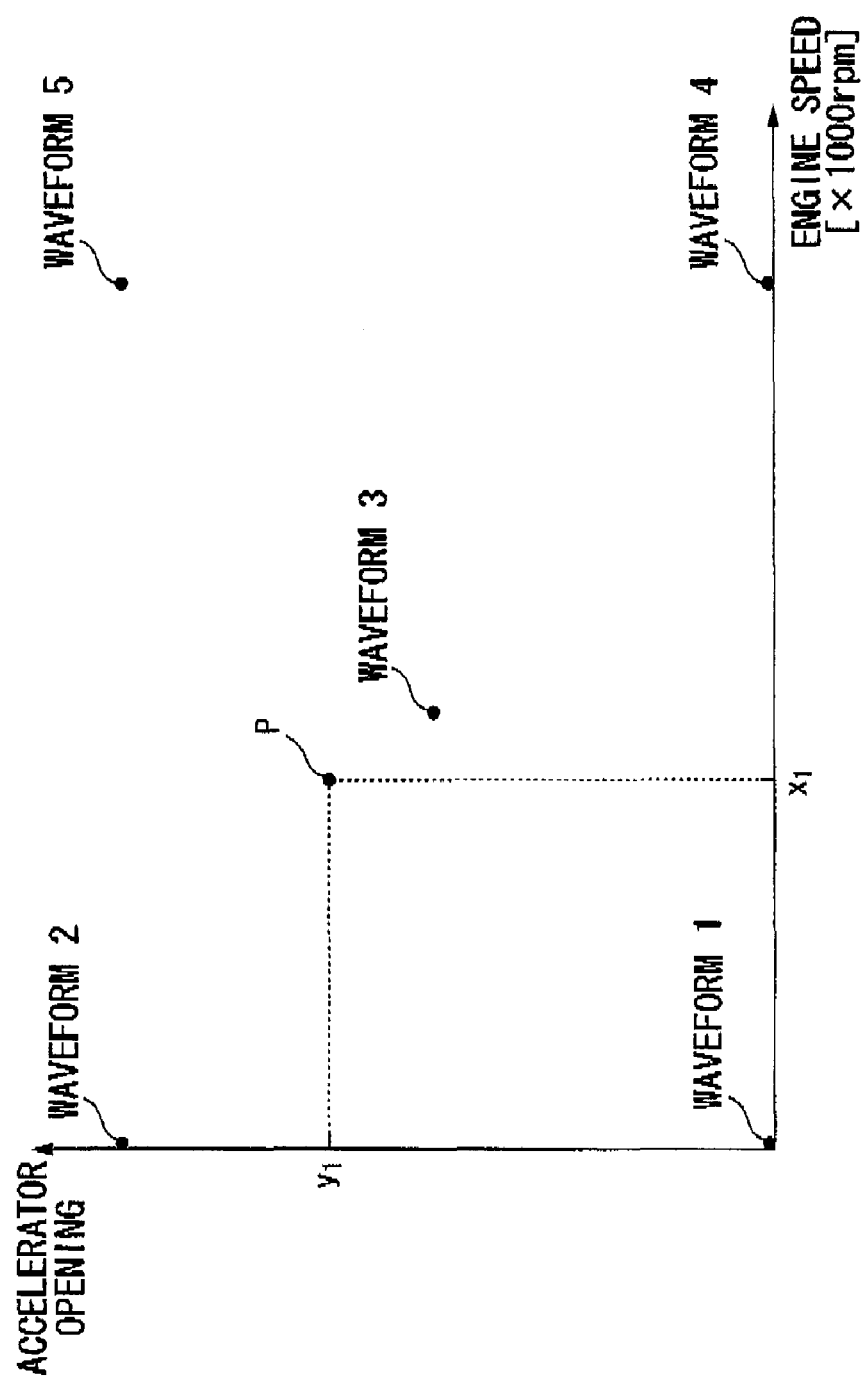
FIG. 4 is a graph showing sound-pressure waveforms in connection to the virtual engine speed and the accelerator opening.

FIG. 4 exemplifies the stored data of the engine sound memory 107 in a table storing sound-pressure waveforms of engine sound in connection to the virtual engine speed and the acceleration opening. Sound-pressure waveforms of engine sound are digital data which are produced by recording actual engine sounds of engine-driven vehicles in advance. FIG. 4 shows five waveforms 1 to 5 in five conditions related to different virtual engine speeds and different accelerator openings, wherein the horizontal axis represents the virtual engine speed in units of 1,000 rpm, and the vertical axis represents the acceleration opening. Based on the accelerator opening information and the virtual engine speed, the engine sound generation unit 105 reads the corresponding sound-pressure waveform from FIG. 4. At a point P indicating the virtual engine speed x1 and the accelerator opening y1, three sound-pressure waveforms (i.e. the waveforms 1 to 3 which are proximate to the point P) are selected and mixed together to form a desired sound-pressure waveform of engine sound. The three waveforms 1 to 3 are mixed with respective weights corresponding to their distances from the point P.

Preset data are produced in advance in the manufacturing of a four-wheeled vehicle and stored in the vehicle-nondependent engine speed memory 106a, the vehicle-dependent engine speed memory 106b, and the engine sound memory 107 (see FIG. 2, FIGS. 3A and 3B, and Table 1).

Figure 5:
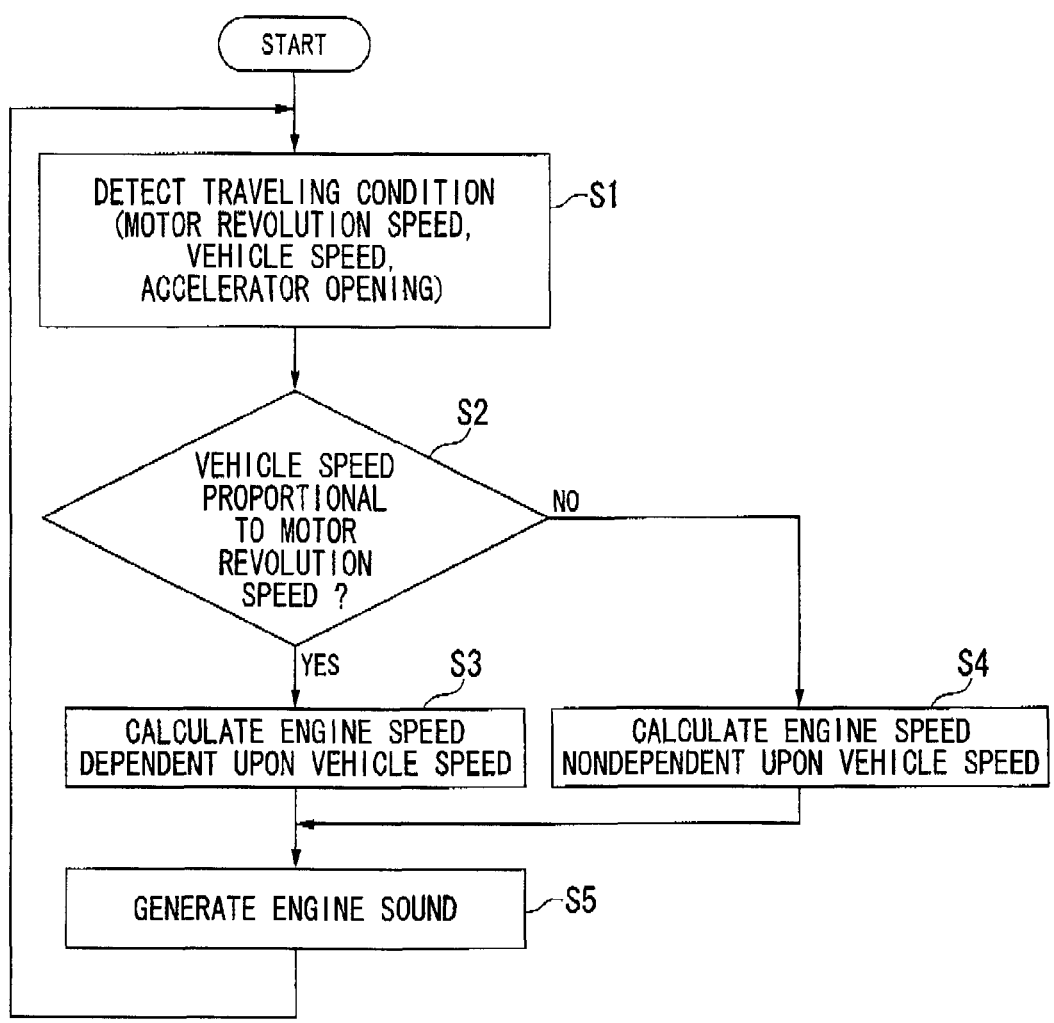
FIG. 5 is a flowchart used for explaining the operation of the engine sound generation device of the first embodiment.

Next, the operation of the engine sound generation device 10 will be described with reference to FIG. 5.

(a) Step S1

During the operating state of the engine sound generation device 10, the motor revolution speed sensor 101, the vehicle speed sensor 102, and the accelerator opening sensor 103 normally perform sensing operations, thus detecting the traveling condition of a vehicle.

(b) Step S2

All the motor revolution speed information, the vehicle speed information, and the accelerator opening information representative of the traveling condition of the vehicle (detected in step S1) are supplied to the engine speed calculation unit 104. In accordance with the motor revolution speed information and the vehicle speed information, the engine speed calculation unit 104 determines whether or not the virtual engine speed varies in proportion to the vehicle speed. For example, when the motor revolution speed does not vary in proportion to the vehicle speed, or when the vehicle speed is lower than a predetermined threshold value, it is determined that the virtual engine speed does not vary in proportion to the vehicle speed. When it is determined that the virtual engine speed varies in proportion to the vehicle speed, the flow proceeds to step S3. When it is determined that the virtual engine speed does not vary in proportion to the vehicle speed, the flow proceeds to step S4.

(c) Step S3

When it is determined that the virtual engine speed varies in proportion to the vehicle speed, the engine speed calculation unit 104 refers to the tables shown in FIGS. 3A and 3B and Table 1 so as to calculate the virtual engine speed. Specifically, the engine speed calculation unit 104 reads the speed from the table of FIG. 3A or 3B in correspondence with the accelerator opening and the vehicle speed, and then it reads the gear ratio from Table 1 in correspondence with the speed. Subsequently, the engine speed calculation unit 104 calculates the virtual engine speed "Ne" using the following equation, in which "V" denotes the vehicle speed, "R" denotes a driving radius of a wheel (or a tire wheel), "it" denotes the gear ratio, and "if" denotes the final reduction gear ratio which is a prefixed gear ratio. When the virtual engine speed Ne is smaller than "600", the engine speed calculation unit 104 determines that the engine of the vehicle is now in an idling state, thus compulsorily setting Ne=600.

$$Ne = \frac{it \cdot if}{2\pi R \cdot (60/1000)} \cdot V$$

(d) Step S4

When it is determined that the virtual engine speed does not vary in proportion to the vehicle speed, the engine speed calculation unit 104 refers to the table of FIG. 2 so as to calculate the virtual engine speed. Specifically, the engine speed calculation unit 104 reads the virtual engine speed from the table of FIG. 2 in correspondence with the accelerator opening.

(e) Step S5

The virtual engine speed calculated in step S3 or step S4 is supplied to the engine sound generation unit 105. In accordance with the virtual engine speed and the accelerator opening information given by the accelerator opening sensor 103, the engine sound generation unit 105 refers to the engine sound memory 107 so as to generate a sound-pressure waveform of the engine sound.

Thereafter, a voltage signal representative of the sound-pressure waveform of the engine sound is supplied to a speaker (not shown) so as to generate the engine sound.

The first embodiment is characterized in that when it is determined that the virtual engine speed does not vary in proportion to the vehicle speed, the engine speed calculation unit 104 reads the virtual engine speed from the predetermined table of FIG. 2, so that the engine sound generation unit 105 correspondingly generates the voltage signal representative of the sound-pressure waveform of the engine sound. In other words, the engine speed calculation unit 104 calculates the virtual engine speed without using the vehicle speed information. This prevents the engine sound generation device 10 from generating an artificially affected engine sound based on the virtual engine speed which is miscalculated in response to the vehicle speed though the virtual engine speed does not vary in proportion to the vehicle speed. Using the predetermined table of FIG. 2 makes it possible to generate the common engine speed (which is not artificially affected) matching the behavior of the engine in the semi-engagement of the clutch or at startup of the vehicle just after its stoppage. Thus, it is possible to generate a common engine sound matching the behavior of the engine of the vehicle. For example, it is possible to generate the high-engine-speed sound occurring in the idling of the engine when the vehicle speed is very low or zero irrespective of the large accelerator opening.

2. Second Embodiment

Next, a second embodiment of the present invention will be described by way of the engine sound generation device 10 shown in FIG. 1, wherein the constitution and operation of the second embodiment are identical to those of the first embodiment except for the following point.

It is possible to presume that the virtual engine speed does not vary in proportion to the vehicle speed (in the semi-engagement of the clutch, for instance) while the vehicle speed is increased from 0 km/h to reach 10 km/h.

Considering the above situation in starting up the engine of the vehicle, the second embodiment introduces a table identifying the correspondence between the accelerator opening and the virtual engine speed (which varies with respect to time), with which the engine speed calculation unit 104 calculates the virtual engine speed.

Figures 6A, 6B:
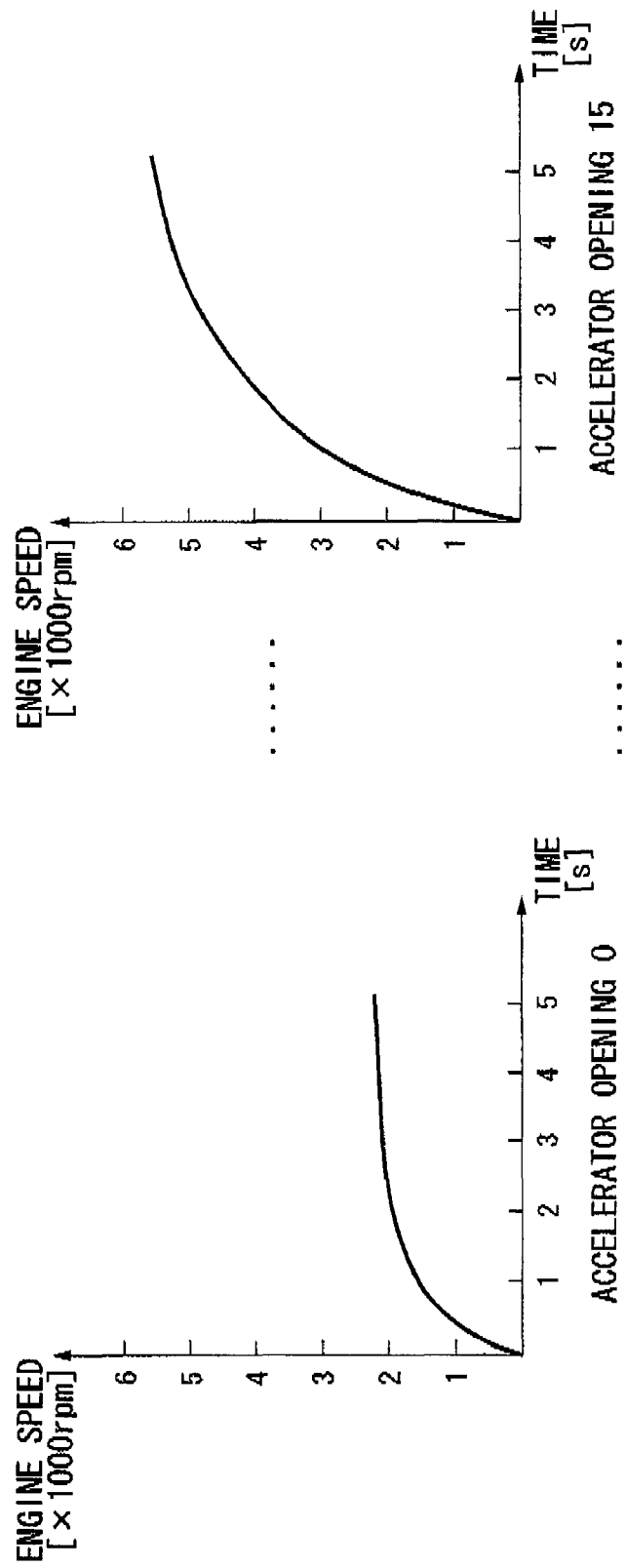
FIG. 6A is a graph showing time-related variations of the virtual engine speed in an accelerator opening range "0" in a second embodiment of the present invention.
FIG. 6B is a graph showing time-related variations of the virtual engine speed in an accelerator opening range "15" in the second embodiment of the present invention.

FIGS. 6A and 6B shows the tables of time-related variations of the virtual engine speed, which is stored in the vehicle-nondependent engine speed memory 106a, wherein the horizontal axis represents the time in units of seconds, and the vertical axis represents the virtual engine speed in units of 1,000 rpm. FIG. 6A shows time-related variations of the virtual engine speed in the accelerator opening range "0", and FIG. 6B shows time-related variations of the virtual engine speed in the accelerator opening range "15". As shown in FIGS. 6A and 6B, a low engine speed increase rate is allocated to a low accelerator opening range, and a high engine speed increase rate is allocated to a high accelerator opening range.

When it is determined that the virtual engine speed does not vary in proportion to the vehicle speed, the engine speed calculation unit 104 reads the virtual engine speed at the lapsed time from the table corresponding to the accelerator opening presently designated by the accelerator opening information.

In short, the second embodiment is designed such that at startup of the vehicle, the engine speed calculation unit 104 calculates the virtual engine speed with reference to the predetermined tables of FIG. 6A and FIG. 6B based on the accelerator opening and the elapsed time. Thus, it is possible to generate the common engine sound matching the behavior of the engine at startup of the vehicle.

3. Third Embodiment

Next, a third embodiment of the present invention will be described by way of the engine sound generation device 10 shown in FIG. 1, wherein the constitution of the third embodiment is identical to that of the first embodiment except for the following point.

The third embodiment is characterized in that the engine speed calculation unit 104 refers to the predetermined relationship between the accelerator opening and the virtual engine speed increase rate on the condition that the virtual engine speed does not vary in proportion to the vehicle speed.

Figure 7:
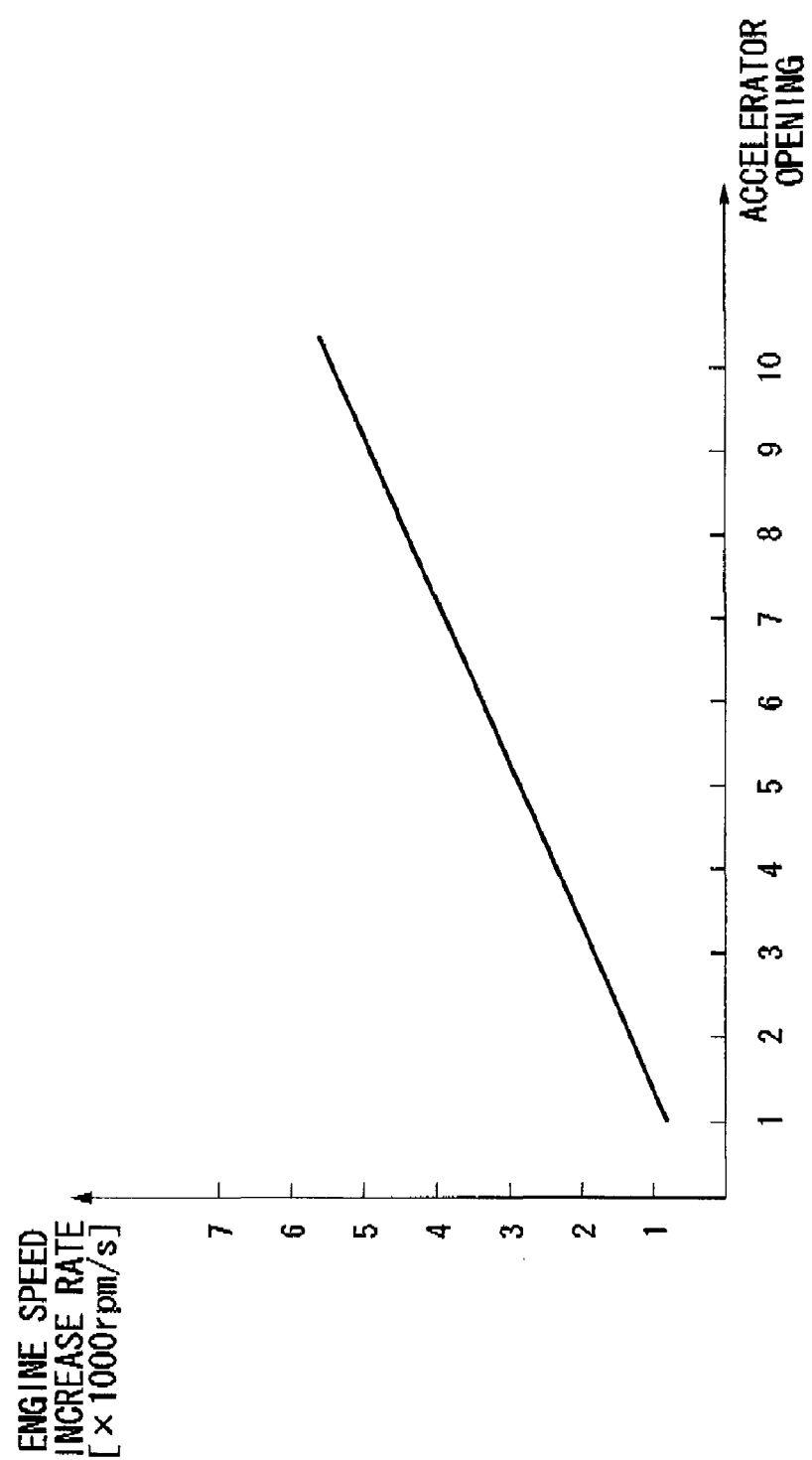
FIG. 7 is a graph showing the relationship between the accelerator opening and the virtual engine speed increase rate in a third embodiment of the present invention.

FIG. 7 is a graph showing the content of a table stored in the vehicle-nondependent engine speed memory 106a, wherein the horizontal axis represents the accelerator opening (e.g. ranges 1-10), and the vertical axis represents the engine speed increase rate in units of 1,000 rpm/s, thus showing linear variations of the engine speed increase rate in connection to the accelerator opening. According to FIG. 7, a low engine speed increase rate is allocated to a low accelerator opening, and a high engine speed increase rate is allocated to a high accelerator opening.

When it is determined that the virtual engine speed does not vary in proportion to the vehicle speed, the engine speed calculation unit 104 reads the engine speed increase rate from the table of FIG. 7 in correspondence with the accelerator opening designated by the accelerator opening information, thus calculating the virtual engine speed in consideration of the engine speed increase rate. Specifically, the engine speed calculation unit 104 multiplies the engine speed increase rate and the elapsed time (which is elapsed from the previous time for calculating the virtual engine speed) so as to produce an increase value, which is then added to the previously calculated virtual engine speed, thus producing the "present" virtual engine speed. The present virtual engine speed is supplied to the engine sound generation unit 105, thus producing the corresponding engine sound.

As described above, the third embodiment is designed such that the engine speed calculation unit 104 reads the engine speed increase rate from the table of FIG. 7 in correspondence with the accelerator opening on the condition that the virtual engine speed does not vary in proportion to the vehicle speed, thus calculating the virtual engine speed. In contrast to the second embodiment in which the virtual engine speed may vary discontinuously with the accelerator opening, the third embodiment is advantageous in that the virtual engine speed does not vary discontinuously with the accelerator opening. Thus, it is possible to precisely calculate the virtual engine speed.

It is possible to modify the embodiments in various ways in connection to the vehicle-nondependent engine speed memory 106a.

For example, it is possible to determine that the virtual engine speed is not proportional to the vehicle speed when an antilock braking system (ABS) of a vehicle detects quick braking made by a driver. In addition, it is possible to determine that the virtual engine speed is not proportional to the vehicle speed when a clutch-state sensor of a vehicle detects the semi-engagement of a clutch.

Moreover, the present invention is applied not only to vehicles which actually travel on roads but also to drive simulators which virtually reproduce driving/traveling conditions of vehicles.

Lastly, the present invention is not necessarily limited to the above embodiments, which can be further rectified within the scope of the invention defined by the appended claims.

What is claimed is:

1. An engine sound generation device comprising:
   an accelerator opening sensor detecting an accelerator opening of a vehicle;
   a vehicle speed sensor detecting a vehicle speed of the vehicle;
   a vehicle-nondependent engine speed memory storing a virtual engine speed which depends upon the accelerator opening but does not depend upon the vehicle speed in advance; and
   an engine speed calculation unit acquiring the virtual engine speed from the vehicle-nondependent engine speed memory in correspondence with the accelerator opening on an estimated condition that the virtual engine speed is not deemed proportional to the vehicle speed.

2. The engine sound generation device according to claim 1, wherein the vehicle-nondependent engine speed memory stores a table of time-related variations of the virtual engine speed in connection to the accelerator opening, so that the engine speed calculation unit reads the virtual engine speed from the table in correspondence with the accelerator opening and an elapsed time.

3. The engine sound generation device according to claim 1, wherein the vehicle-nondependent engine speed memory stores a table of an engine speed increase rate in connection to the accelerator opening, so that the engine speed calculation unit reads the engine speed increase rate from the table in correspondence with the accelerator opening, thus calculating the virtual engine speed using an elapsed time.

4. The engine sound generation device according to claim 1 further comprising a vehicle-dependent engine speed memory storing the virtual engine speed which depends upon the accelerator opening and the vehicle speed, wherein the virtual engine speed calculation unit calculates the virtual engine speed with reference to the vehicle-dependent engine speed memory on an estimated condition that the virtual engine speed is deemed proportional to the vehicle speed, and wherein the virtual engine speed calculation unit calculates the virtual engine speed with reference to the vehicle-nondependent engine speed memory on the estimated condition that the virtual engine speed is not deemed proportional to the vehicle speed.

5. The engine sound generation device according to claim 1 further comprising an engine sound generation unit which artificially generates an engine sound based on the virtual engine speed.

* * * * *